United States Patent [19]
Miike et al.

[11] Patent Number: 6,052,714
[45] Date of Patent: *Apr. 18, 2000

[54] INFORMATION FILTERING APPARATUS AND METHOD FOR RETRIEVING A SELECTED ARTICLE FROM INFORMATION SOURCES

[75] Inventors: Seiji Miike; Masahiro Kajiura, both of Kanagawa-ken; Tetsuya Sakai, Tokyo; Kenji Ono; Kazuo Sumita, both of Kanagawa-ken, all of Japan

[73] Assignee: Kabushiki Kaisha Toshiba, Japan

[ * ] Notice: This patent is subject to a terminal disclaimer.

[21] Appl. No.: 08/766,859

[22] Filed: Dec. 13, 1996

[30]  Foreign Application Priority Data

Dec. 14, 1995 [JP] Japan ................................. 7-325907

[51] Int. Cl.[7] ..................................................... G06F 15/16
[52] U.S. Cl. ......................... 709/217; 698/202; 698/203; 698/206; 698/226; 707/1; 707/10
[58] Field of Search ..................................... 395/898, 500, 395/200.3, 200.31, 200.32, 200.35, 200.36, 200.47, 182.01, 200; 455/4.2, 5.1; 348/2, 7–12; 709/200–203, 204–207, 217–219, 226; 707/1–6, 10, 100–104; 713/200, 201

[56]  References Cited

U.S. PATENT DOCUMENTS 5,530,852  6/1996  Meske, Jr. et al. ..................... 709/205
5,649,186  7/1997  Ferguson .................................. 707/10
5,699,513 12/1997  Feigen et al. ........................... 713/201
5,754,939  5/1998  Herz et al. .............................. 709/219
5,867,799  2/1999  Lang et al. ................................ 707/1
5,907,836  5/1999  Sumita et al. ............................. 707/2

OTHER PUBLICATIONS

"The SMART Retrieval System: Experiments in Automatic Document Processing," Gerard Salton, et al., Cornell University, pp. 143–180 (1971).

Primary Examiner—Ahmad F. Matar
Assistant Examiner—Bharat Barot
Attorney, Agent, or Firm—Finnegan, Henderson, Farabow, Garrett & Dunner, L.L.P.

[57]  ABSTRACT

An information filtering apparatus for providing articles to a user includes an article extraction section that retrieves articles from articles stored in an article storage section using a user-profile. An excerpt generating section generates excerpts of the retrieved article by calculating similarities between the retrieved articles and the user-profile to generate the excerpt including the user's necessary information. An abstract generating section combines excerpts to form an abstract. The user-profile for each user in the user-profile storage section is modified in accordance with user feedback.

21 Claims, 17 Drawing Sheets

<FORMAT>

| WORD: (WEIGHT) |

<EXAMPLE>

MULTIMEDIA (1)
CD-ROM (2)
PC (3)
MOTION PICTURE (1)
AUDIO (1)

<FORMAT>

| ARTICLE ID; PUBLISHER; HEADLINE; POINTER |
|---|

FIG. 5(a)

<FORMAT>

| RANK OF THE ARTICLE; ARTICLE ID |

FIG. 6(a)

<EXAMPLE>

| |
|---|
| 1 ;  0 0 1 |
| 2 ;  0 0 2 |
| 3 ;  0 0 3 |
| 4 ;  0 0 4 |

FIG. 6(b)

DEC. 1, 19XX

THEME: MULTIMEDIA

1. HEADLINE 1      A NEWSPAPER

TEXT OF THE ARTICLE 1

2. HEADLINE 2      B NEWSPAPER

TEXT OF THE ARTICLE 2

3. HEADLINE 3      C PUBLISHER

TEXT OF THE ARTICLE 3

*FIG. 7*

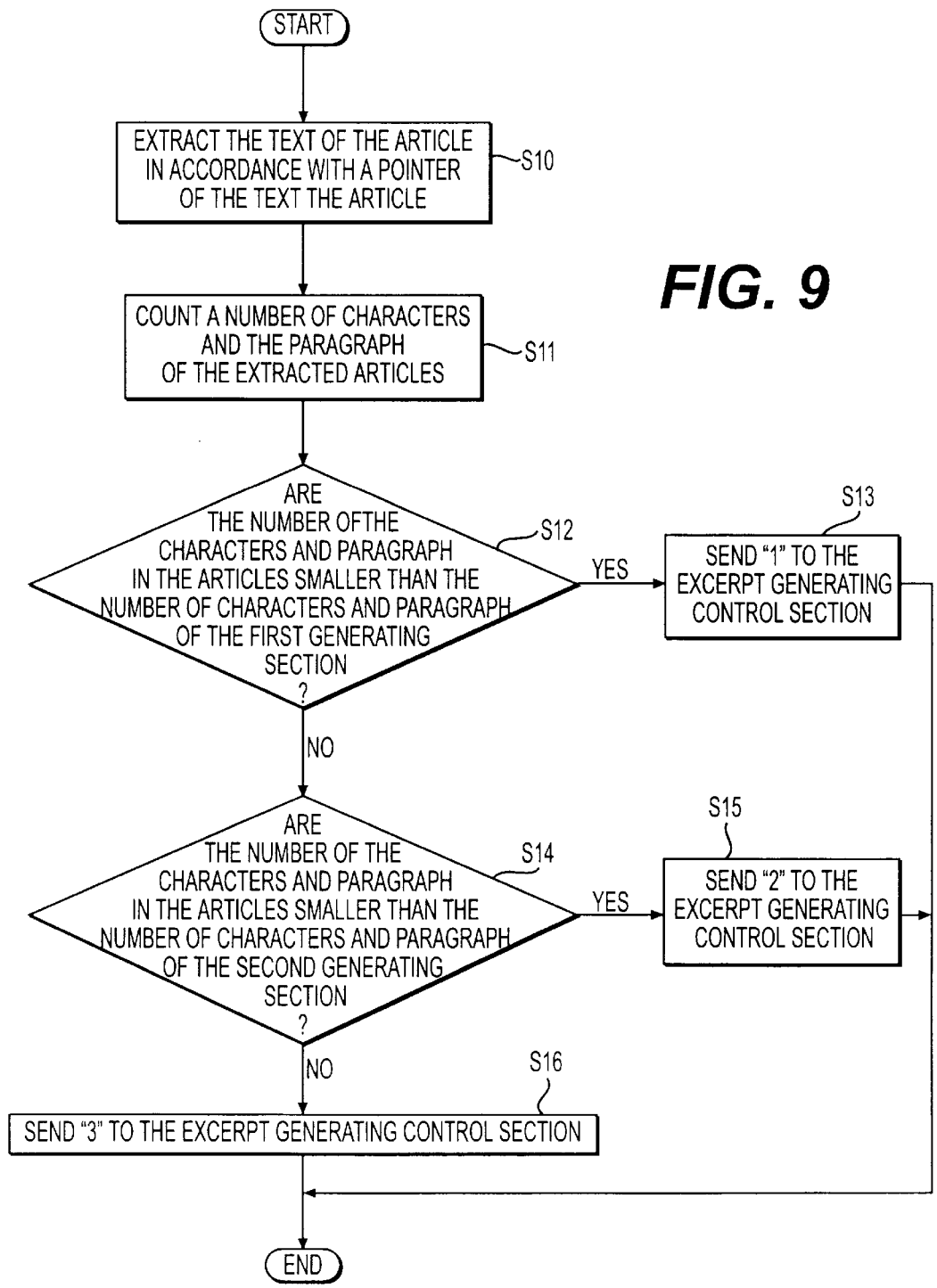

<FORMAT>

| GENERATING SECTION ID; NUMBER OF CHARACTERS;NUMBER OF PARAGRAPHS |
|---|

FIG. 10(a)

<EXAMPLE>

| 1 | ; | 400 | ; | 5 |
|---|---|---|---|---|
| 2 | ; | 800 | ; | 10 |
| 3 | ; | 10000 | ; | 100 |

FIG. 10(b)

<FORMAT>

NUMBER OF THE PARAGRAPH; SIMILARITY OF THE PARAGRAPH; TEXT OF THE PARAGRAPH

<EXAMPLE>

```
4 ; 0.45 ; MULTIMEDIA ~。
5 ; 0.32 ; ~。
3 ; 0.29 ; ~。
1 ; 0.13 ; THE BUDGET OF ~。
2 ; 0.12 ; ~。
6 ; 0.05 ; ~。
7 ; 0.04 ; ~。
8 ; 0.00 ; ~。
```

FIG. 13

DEC. 1, 19XX

THEME : MULTIMEDIA

1. HEADLINE 1    A NEWSPAPER    001

EXCERPT:
FIRST PARAGRAPH

2. HEADLINE 2    B NEWSPAPER    002

EXCERPT:
FIRST PARAGRAPH
5TH PARAGRAPH

3. HEADLINE 3    C PUBLISHER    003

EXCERPT:
6TH PARAGRAPH
14TH PARAGRAPH
21ST PARAGRAPH

*FIG. 15*

DEC. 1, 19XX

THEME : MULTIMEDIA

1. | HEADLINE 1 |    ◯    001

2. | HEADLINE 2 |    ✕    002

3. | HEADLINE 3 |         003

*FIG. 16*

INFORMATION FILTERING APPARATUS AND METHOD FOR RETRIEVING A SELECTED ARTICLE FROM INFORMATION SOURCES

BACKGROUND OF THE INVENTION

1. Field of the Invention

The present invention relates to an information filtering apparatus, a method for retrieving articles required by a user from a quantity of text articles, and a method for providing the retrieved articles to the user.

2. Description of the Related Art

Recently, word processors and computers have come into wide use. Electronic mail and electronic news have also come into use. So, electronic documents are spread rapidly.

Hereafter, in same way as electronic publication, information of contents of newspapers, magazines and books will be provided as electronic documents.

And, demand for an information filtering system or service for selecting predetermined articles that are required by a user are increased from a quantity of text articles and for periodically providing them for the user increase.

In order to decrease a quantity of information, a technique to make excerpts of documents are researched. A prior art is a method for extracting a first paragraph from the information or a method for extracting a sentence including a predetermined keyword.

However, the method for extracting the first paragraph is not adequate. Because, the first paragraph may not include information required by user. And, the method for extracting the sentence including the predetermined keyword is not adequate. Because, a content of extracted sentences is indefinite in case the extracted sentences are arranged.

In this place, the predetermined keyword is not changed if the user does not add or modify the keyword. So, it is difficult to change the keyword.

SUMMARY OF THE INVENTION

An object of the present invention is to provide an information filtering apparatus and method for retrieving predetermined articles from a quantity of text articles and for providing an excerpt of the predetermined articles according to a request of the user.

In accordance with the present invention, the foregoing objects, among others, are achieved by providing an apparatus for retrieval having: means for retrieving articles requested by the user from articles sent from information sources according to retrieval conditions for each user; generation means for generating an excerpt of the articles retrieved by said retrieving means according to said retrieval conditions; and, sending means for sending the excerpt generated by said generating means to the user.

In accordance with another aspect of the present invention, an apparatus for retrieving is provided having: means for retrieving articles requested by a user from articles sent from information sources according to retrieval conditions for each user; a plurality of generation means for respectively generating an excerpt of the articles retrieved by said retrieval means according to said retrieval conditions and feature of articles; feature extraction means for extracting a feature of the articles retrieved by said retrieval means; selection means for selecting one of the generating means from said plurality of generation means according to the feature of the articles extracted by the feature extraction means; and, sending means for sending the excerpt of the articles generated by said generation means selected by said selection means.

In accordance with another aspect of the present invention, a method includes the steps of: for retrieving articles requested by the user from articles sent from information sources according to retrieval conditions for each user; generating an excerpt of the articles retrieved at retrieving step according to said retrieval conditions; and, sending the excerpt generated at generating step to the user.

In accordance with another aspect of the present invention, a method includes the steps of: for retrieving articles requested by the user from articles sent from information sources according to retrieval conditions for each user; extracting a feature of the articles retrieved at retrieving step: generating an excerpt of the articles retrieved at retrieving step according to said retrieval condition and said feature of the articles extracted at extracting step; and, sending the excerpt generated at generating to the user.

BRIEF DESCRIPTION OF THE DRAWINGS

Other object and features of the invention will become apparent to those skilled in the art as the disclosure is made in the following description of a preferred embodiment of the invention, as illustrated in the accompanying sheets of drawings, in which;

FIG. 6 is an example of a form of a retrieval result stored in a retrieval result storage section in FIG. 3;

FIG. 7 is an output of the information filtering apparatus;

FIG. 9 is a flow chart of processing of an article feature generating section in FIG. 3;

FIG. 10 is an example of a form of an excerpt generating condition table;

FIG. 13 is an example of a form of a result of calculating paragraph similarities;

FIG. 15 is an example of an information filtering result for sending to user;

FIG. 16 is an example of an answer data stored in a user answer data storage section in FIG. 3;

DESCRIPTION OF THE PREFERRED EMBODIMENTS

Figure 1:
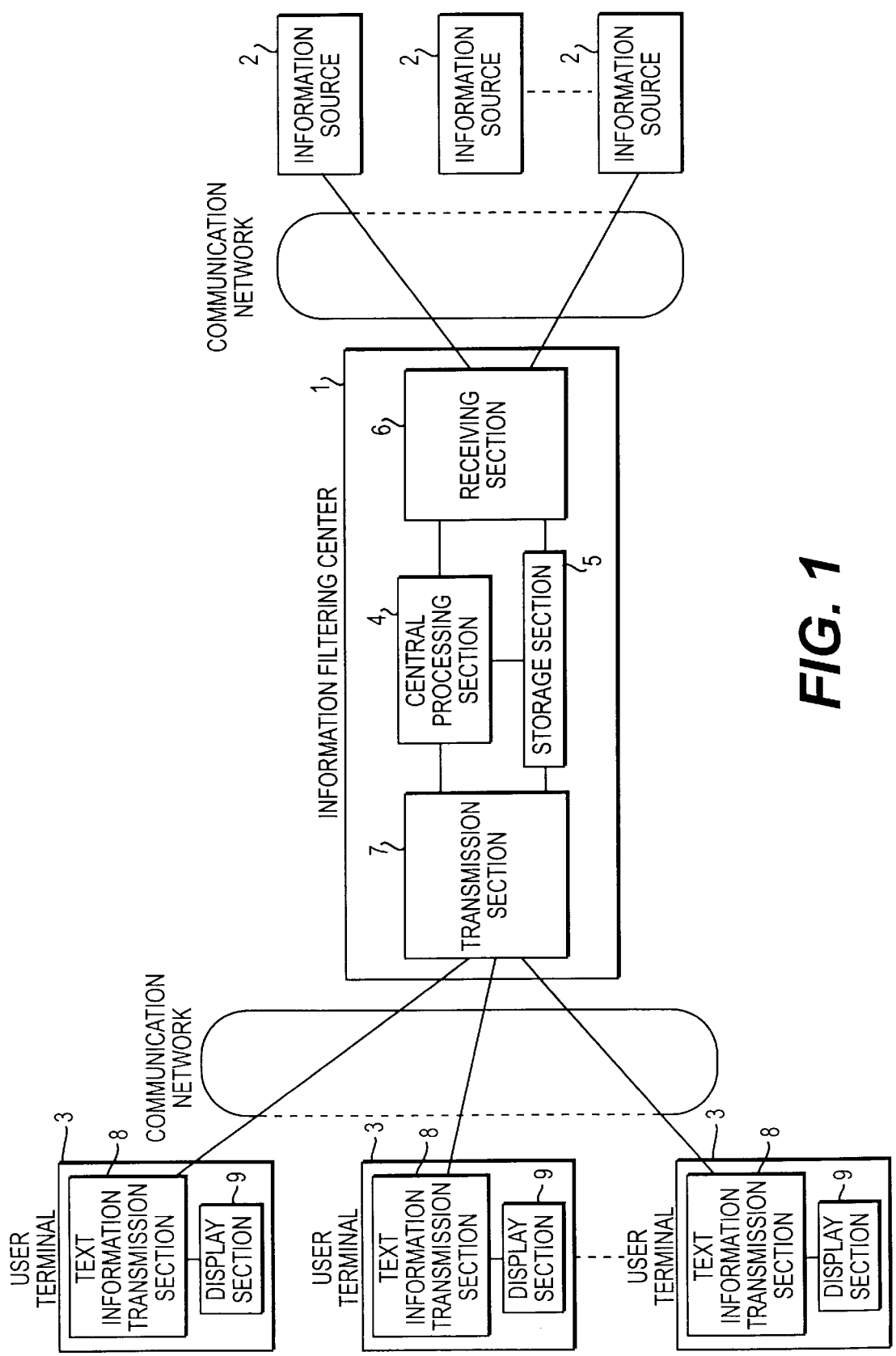
FIG. 1 is a block diagram showing the overall structure of an information filtering system according to the present invention.

Referring to the drawings, preferred embodiments of the present invention will be described.

FIG. 1 shows an overall structure of an information filtering system according to the present invention.

The information filtering system receives text articles from a plurality of information sources 2. This information sources are, for example, newspaper publishing companies, news agencies and publishers. The information filtering system periodically sends received articles to subscribed user terminals 3. An information filtering center 1 executes this service in processing.

The information filtering center 1 is an information filtering apparatus connected to a plurality of information sources 2 and a plurality of subscribed user terminals 3 through a communication networks. The information filtering center 1 is comprised of a central processing unit 4 for controlling and for processing an information filtering operation, a storage unit 5 such as a semiconductor memory, a magnetic disk or an optical disk, for storing programs and data, a receiving section 6 for receiving text articles from the information sources 2 through the communication networks such as a communication line or radio waves, and a transmission section 7 for sending the text articles to the user terminals 3 and for receiving answer data from the user terminals 3 through the communication networks such as the communication line or radio waves.

Each of the user terminals 3 is comprised of a text information transmission section 8 for receiving the text articles from the information filtering center 1 and for sending the answer data to the information filtering center 1 and a display section 9 for displaying the text articles received by the text information transmission section 8. Each of the user terminals 3 is an information processing terminal such as a personal computer or a work station.

Figure 2:
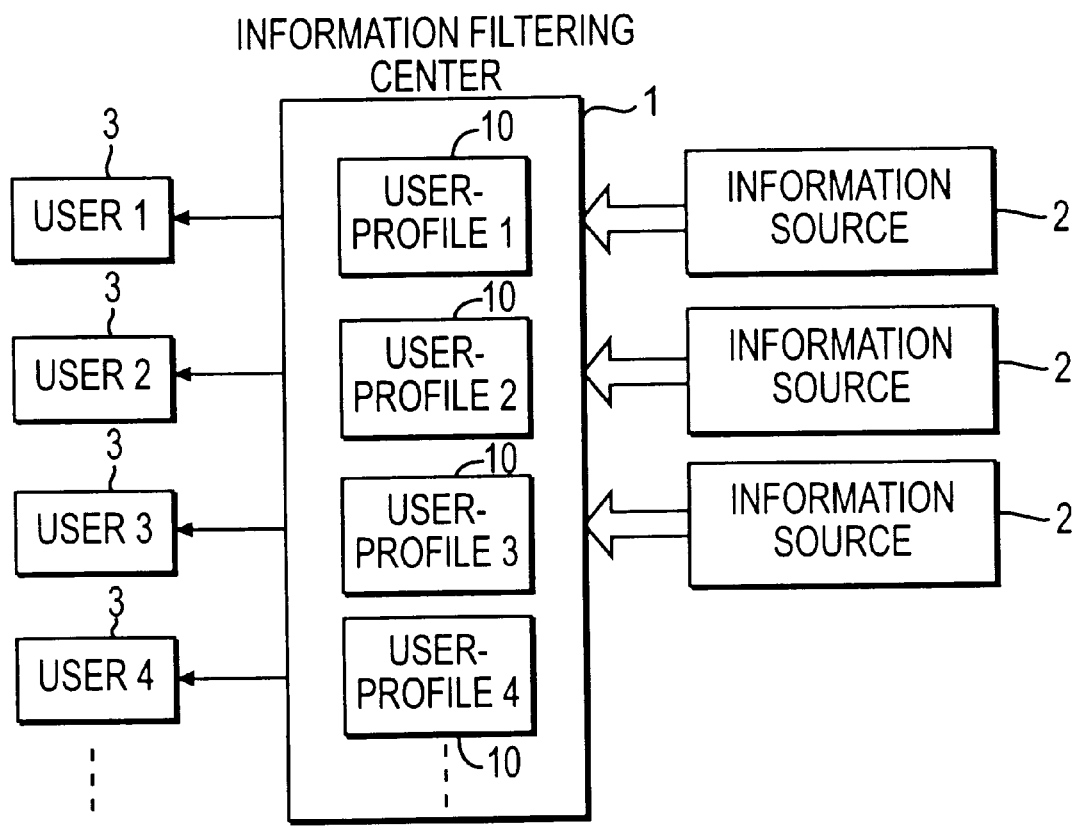
FIG. 2 is a schematic diagram of the information filtering system shown in FIG. 1.

The information filtering center 1 stores a retrieval condition called user-profile 10 for every user as shown in FIG. 2. And, the information filtering center 1 retrieves the articles to provide for the user in accordance with the user-profile 10. The user-profile 10 is comprised of a plurality of predetermined theme or topics.

Figure 3:
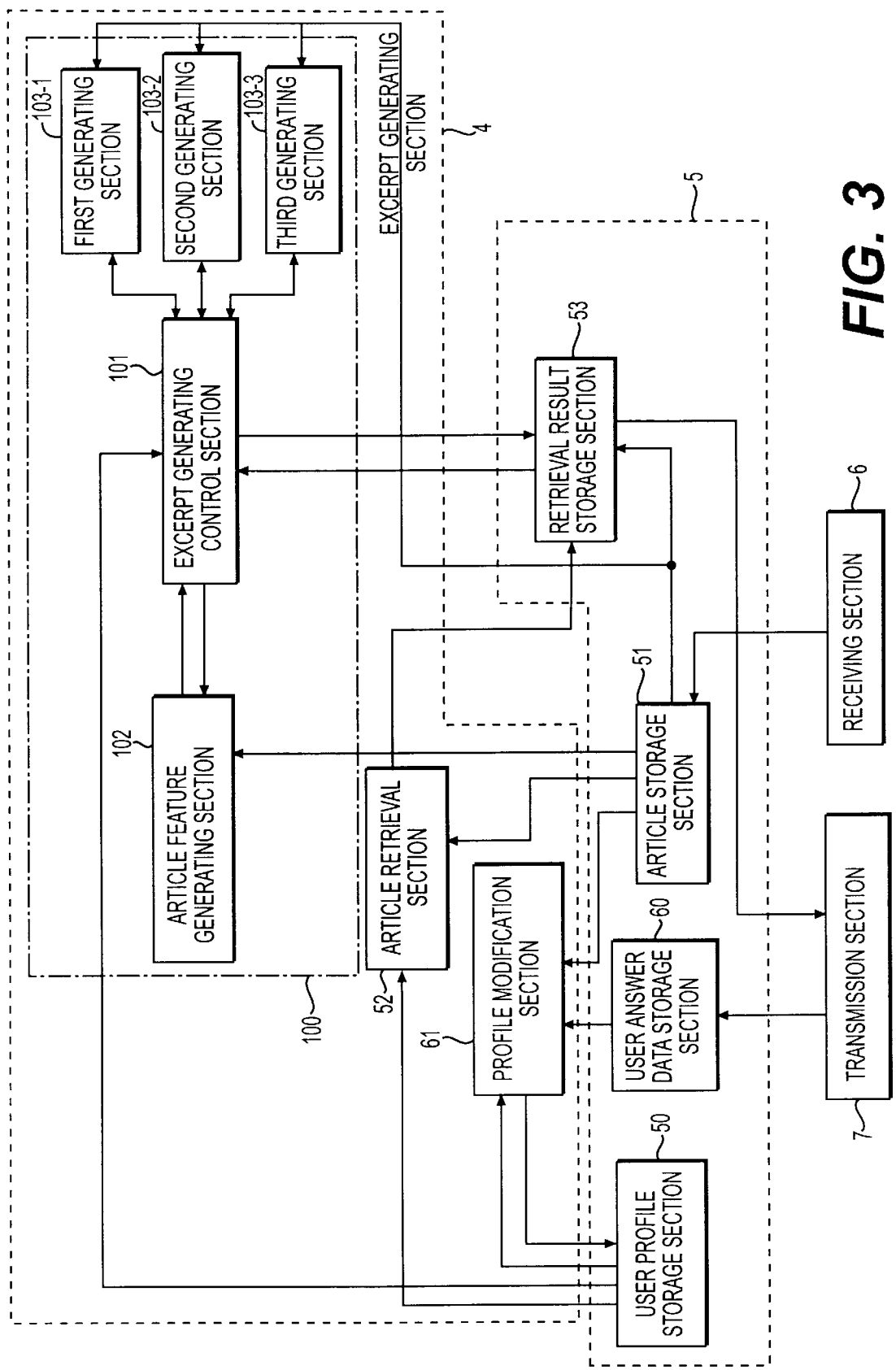
FIG. 3 is a block diagram showing the structure of an information filtering apparatus.

FIG. 3 shows the structure of the information filtering center 1.

A user-profile storage section 50 stores the user-profiles for retrieving the articles. A form of pro-file is shown in FIG. 4.

Figures 4A, 4B:
FIG. 4 is an example of a form of a user-profile.

The profile is comprised of words included in articles required by the user and weight of the word as shown in FIG. 4(a). Specifically, the user-profile stores a plurality of the words and weight of the words for every user as shown in FIG. 4(b). For example, an operator of the system searches articles required by the user and generates the pro-file by extracting words included in articles required by user.

An article storage section 51 stores the articles received by the receiving section 6. A form of article data stored in the article storage section 51 is shown in FIG. 5.

Figure 5B:
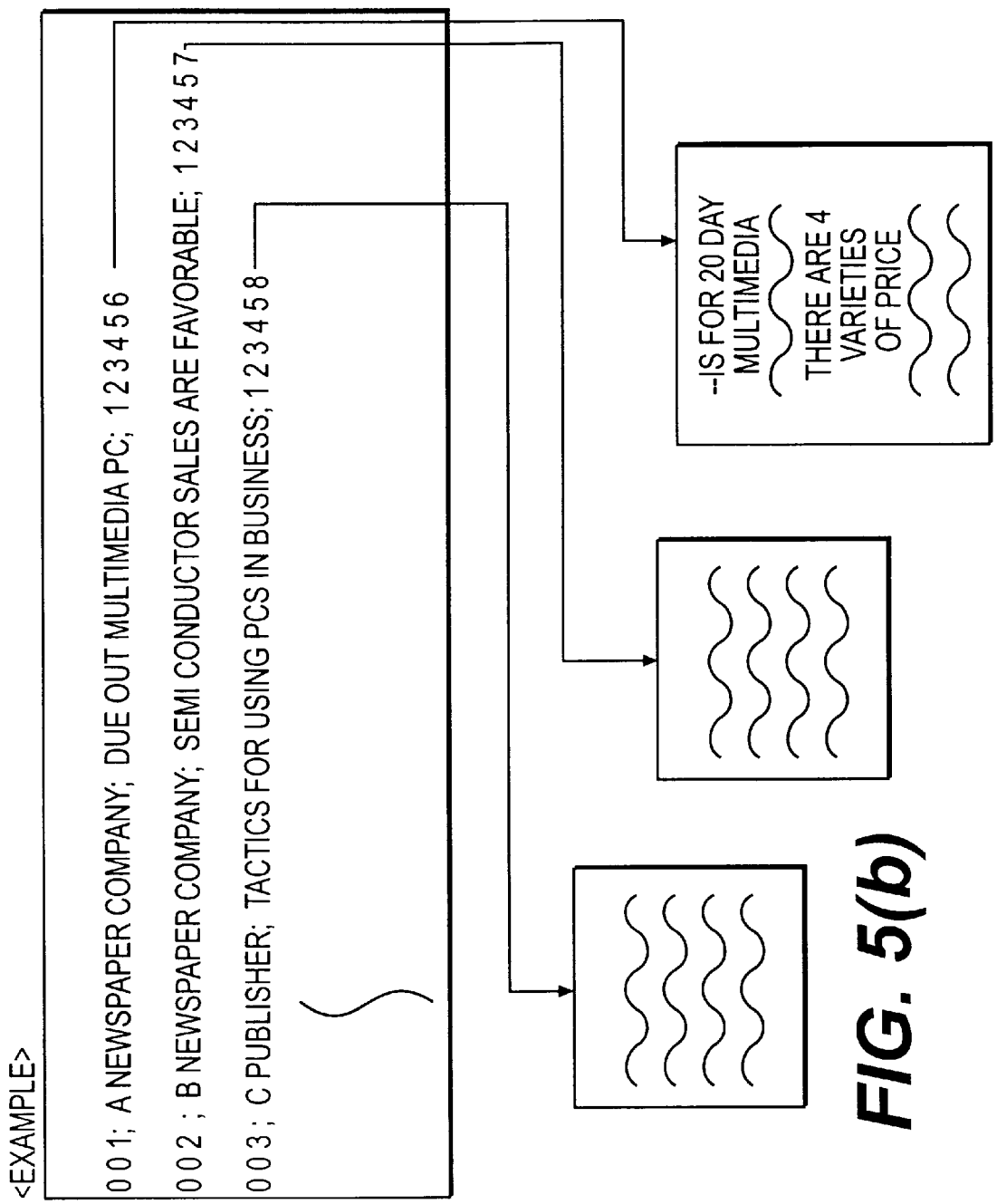
FIG. 5 is an example of a form of an article data stored in an article storage section in FIG. 3.

As shown in FIGS. 5(a) and 5(b), the article data is comprised of an article ID such as "001,002,003 . . . " to discriminate all articles controlled by the information filtering center 1, publisher of the articles such as "A news paper company, B news paper company, C publisher", headline of the articles such as "Due Out Multimedia PC . . . ", and text pointer of article data such as "123456, 123457, 123458 . . . ". The article data are stored in the article storage section 51.

An article retrieval section 52 extracts the articles stored in the article storage section 51 using the user-profile stored in the user-profile storage section 50. A method for extracting the articles is used as a method described in "SMART information filtering system". In this method, a vector space of each words described in the profile is supposed and an inner product between a vector of the weight of each words in this vector space and a vector of a count of an appearance of the words in the predetermined articles is calculated. A value of the inner product is a similarity of the profile. Next, the extracted articles are ranked in order of large value of the similarity and outputted according to the rank.

A retrieval result output by the article retrieval section 52 is shown in FIG. 6. FIG. 6 shows a sample of retrieved four articles for a profile. The retrieval result is composed by a user-profile ID, a rank of the articles according to the similarity such as "1,2,3,4 . . . ", and an article ID. This retrieval result is stored in a retrieval result storage section 53.

A result of the information filtering sent to the user is shown in FIG. 7. This result of the information filtering is comprised of a rank of the articles, a headline of the articles and the text of the articles.

An excerpt generating section 100 generates an excerpt of the articles comprised the retrieval result stored in the retrieval result storage section 53. The excerpt generating section 100 is composed by an excerpt generating control section 101, an article feature generating section 102 and a plurality of generating sections, for example three generating sections 103-1, 103-2, 103-3, here.

The article feature generating section 102 extracts article features such as a number of characters and paragraph of the articles from the articles retrieved by the article retrieval section 52.

A first generating sections 103-1, a second generating sections 103-2, and a third generating sections 103-3 respectively generate excerpts in accordance with the article features extracted by the article feature generating section 102.

The excerpt generating control section 101 controls all of the excerpt generating section 100.

Figure 8:
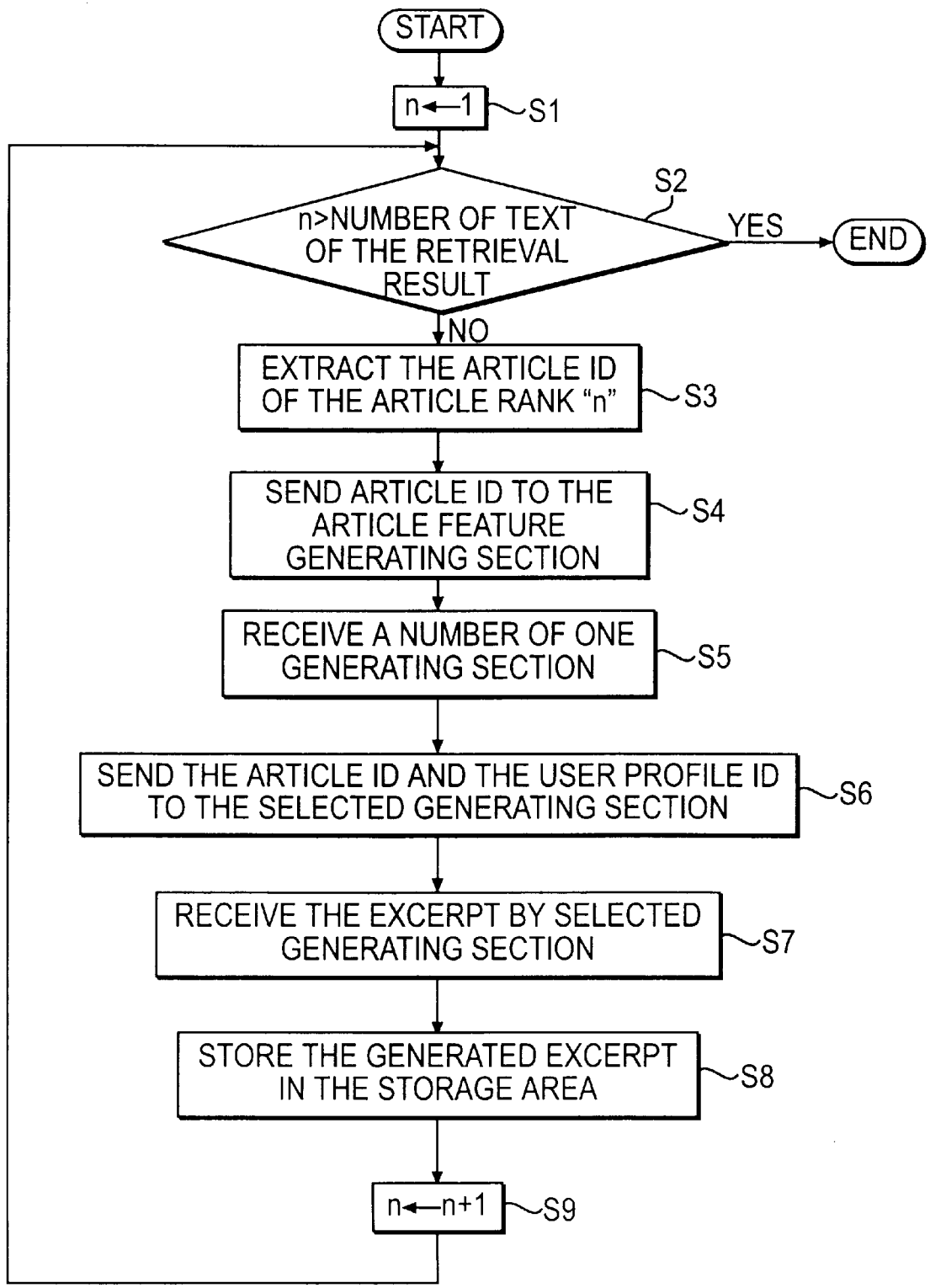
FIG. 8 is a flow chart of processing of an excerpt generating control section in FIG. 3.

FIG. 8 is a flow chart for processing of the excerpt generating control section 101.

The excerpt generating control section 101 extracts the retrieval result stored in the retrieval result storage section 53 in order of the large article rank "n" in step 1–step 3. Next, the excerpt generating control section 101 executes following processing for the article ID of the information filtering result.

First, the excerpt generating control section 101 sends the article ID to the article feature generating section 102. The article feature generating section 102 sends a number of one generating section selected from three generating sections (step 4, step 5). Here, the first generating sections 103-1 is "1", the second generating sections 103-2 is "2", and the third generating sections 103-3 is "3".

Next, the excerpt generating control section 101 sends the article ID and the user-profile ID to the selected generating sections (step 6). The excerpt generating control section 101 receives the excerpt generated by the selected generating sections (step 7). The excerpt generating control section 101 stores the generated excerpt in storage area of the article storage section 51 in accordance with the article rank and the article ID stored in the retrieval result storage section 53 (step 8). As mentioned above, the excerpt generating control section 101 generates the information filtering result for sending to the user.

FIG. 9 is a flow chart for processing of the article feature generating section 102.

The article feature generating section 102 extracts the text of the article in accordance with a pointer of the text of the article in the article storage section 51 by using the received article ID from the excerpt generating control section 101. Next, the article feature generating section 102 counts a number of characters and the paragraph of the extracted articles (step 11). It is possible to count the paragraph because of spaces located at the top of the paragraph. And, the article feature generating section 102 processes with referring an excerpt generating condition table previously stored.

A form of the excerpt generating condition table in the article feature generating section 102 is shown in FIG. 10(a). The detailed form of the excerpt generating condition table is shown in FIG. 10(b). The form of the excerpt generating condition table is consisted of a generating section ID to discriminate the plurality of the generating sections such as "1,2,3", the maximum of the characters in the articles such as "400,800.10000", and the maximum of the number of the paragraph in the articles such as "5,10.100" corresponding to its generating section.

The article feature generating section 102 extracts the number of characters and paragraph of the first generating section 103-1 corresponding to the generating section ID "1"stored in first line of the excerpt generating condition table as shown in FIG. 10. And, the article feature generating section 102 compares the number of the characters and paragraph in the articles with the number of characters and paragraph of the first generating section 103-1 (step 12). If the number of the characters and paragraph in the articles are smaller than the number of characters and paragraph of the first generating section 103-1, the article feature generating section 102 sends "1" to the excerpt generating control section 101 (step 13).

If this first condition is not satisfied, the article feature generating section 102 compares the number of the characters and paragraph in the articles with the number of characters and paragraph of the second generating section 103-2 (step 14). If the number of the characters and paragraph in the articles are smaller than the number of characters and paragraph of the second generating section 103-2, the article feature generating section 102 sends the generating section ID "2" to the excerpt generating control section 101 (step 15). If this second condition is not satisfied, the article feature generating section 102 sends the generating section ID "3" of the third generating section 103-3 to the excerpt generating control section 101 (step 16).

The excerpt generating control section 101 selects one of the generating section in accordance with the generating section ID received from the article feature generating section 102. The excerpt generating control section 101 sends the article ID and the user-profile to selected generating section.

Next, the processing of the first generating section, the second generating section and the third generating section are explained in detail.

First, the first generating section 103-1 extracts first paragraph of the article stored in the article storage section 51 using the article ID received from the excerpt generating control section 101. It is usual that main information written in the first paragraph in the articles which have little number of characters or paragraph. So, the first generating section 103-1 extracts the first paragraph stored in the article storage section 51.

Figure 11:
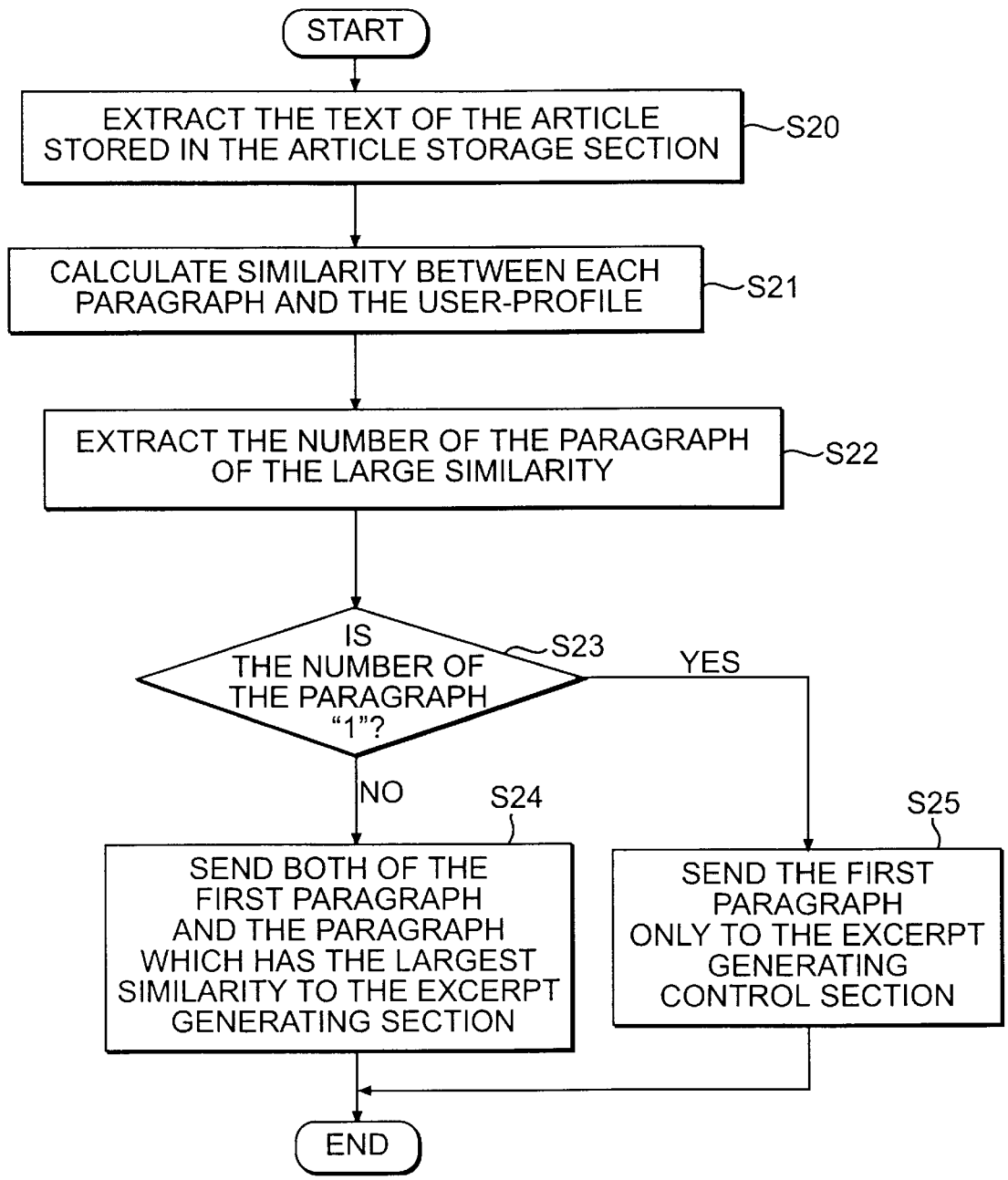
FIG. 11 is a flow chart of processing of a second generating section in FIG. 3.

Next, the processing of the second generating section 103-2 is shown in a flow chart of FIG. 11. First, the second generating section 103-2 extracts the text of the articles stored in the article storage section 51 using the article ID received from the excerpt generating control section 101 (step 20). The second generating section 103-2 calculates similarity between each paragraph in the text of the article and the user-profile(step 21).

Figure 12:
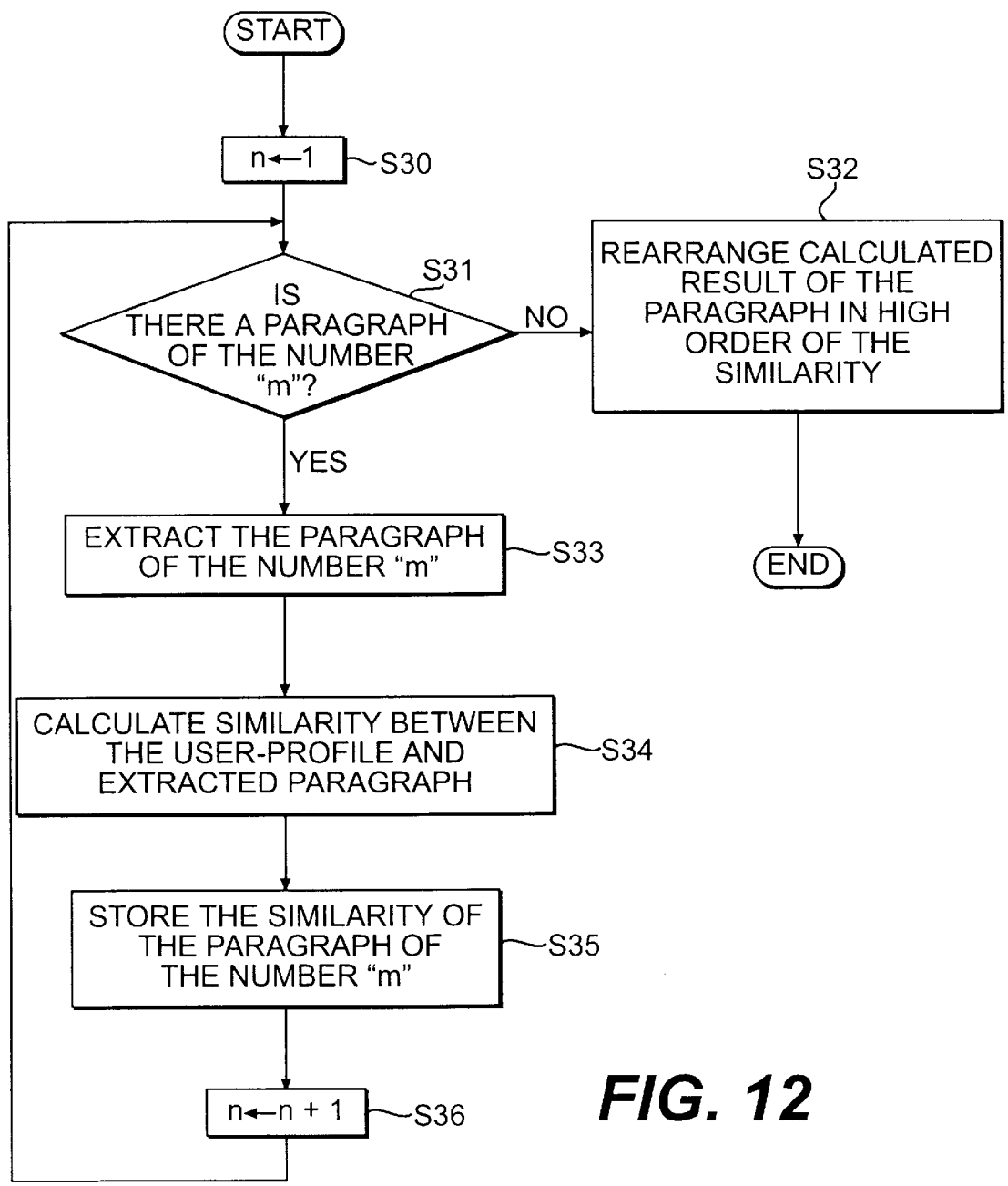
FIG. 12 is a flow chart of processing of calculating paragraph similarities.

FIG. 12 is a flow chart for processing of calculating the paragraph similarities.

First, the second generating section 103-2 extracts paragraph orderly from first paragraph in the text of the articles stored in the article storage section 51 (step 30–33). Next, the second generating section 103-2 extracts predetermined user-profile stored in the user-profile storage section 50 using the user-profile ID. The second generating section 103-2 calculates similarities between the user-profile and extracted paragraph (step 34). The second generating section 103-2 stores the similarities (step 35).

The similarities of the paragraph is calculated by the calculation method of the article retrieval section 52 described above.

After the all similarities of the paragraph are stored (step 36, step 31), the second generating section 103-2 rearranges calculated result of the paragraph in high order of the similarities of the paragraph (step 32). In this case, the calculated result of similarities of the paragraph is stored in predetermined area assigned to the second generating section 103-2 of the retrieval result storage section 53. For example, the calculated result of the similarities of the paragraph is stored as shown in FIG. 13. The calculated result of the similarities of the paragraph is comprised of a number of the paragraph, the similarities, and the text of the paragraph as shown in FIG. 13(a). The similarities of the paragraph is located in high order of the similarities as shown in FIG. 13(b).

It is returned to describe of FIG. 11. The second generating section 103-2 extracts the number of the paragraph of the largest similarities (step 22). If the number of the paragraph is "1", the second generating section 103-2 sends the first paragraph only to the excerpt generating control section 101 (step 23, step 25). If the number of the paragraph is not "1", the second generating section 103-2 sends both of the first paragraph and the paragraph which has the largest similarities to the excerpt generating control section 101 (step 23, step 24).

As mentioned above, the second generating section 103-2 extracts both of the first paragraph in which the main information written and the paragraph in which the user interested (which has the largest similarities). For example, as for the article of a budget of nation or a self-governing body, an overall information of the budget is described in the first paragraph. And, items of account of the budget is respectively described in each paragraph after the second paragraph. So, if a user is interested in the multimedia, this system extracts the paragraph of the budget about the multimedia and sends the paragraph of the budget with the first paragraph. Thus, the user can get the overall information of the budget from the first paragraph additionally get the interested information.

The combination of the first paragraph and the paragraph on the budget comprises an abstract sent to the user. An abstract may include two or more extracts. Thus, the second generating section 103-2 creates an abstract composed of two extracts: the first paragraph and the paragraph on the budget.

Further more, it is possible that this system extracts a plurality of paragraphs in order of the largest similarities except for the first paragraph.

Figure 14:
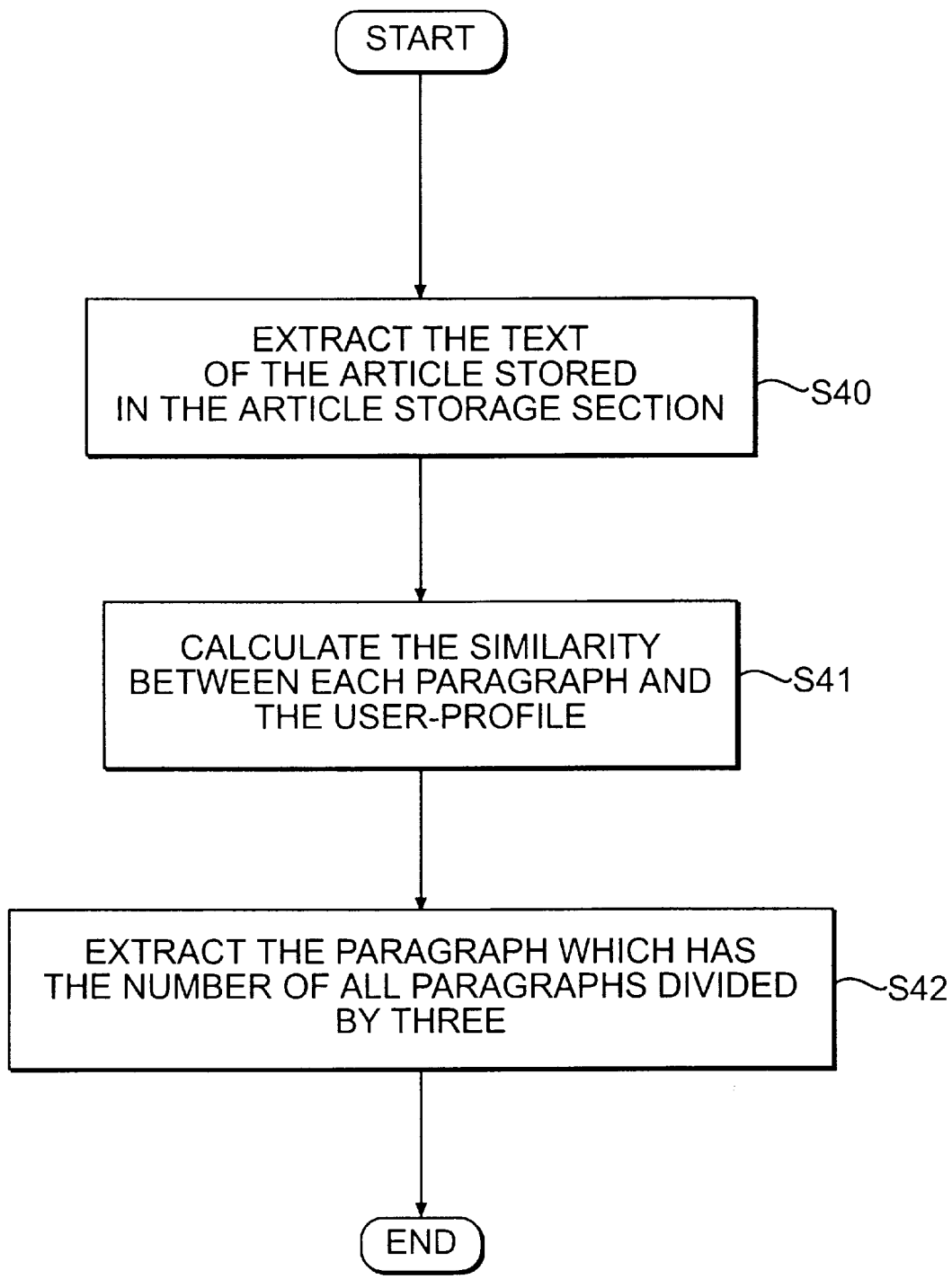
FIG. 14 is a flow chart of processing of a third generating section in FIG. 3.

FIG. 14 is a flow chart for processing of the third generating section 103-3.

The third generating section 103-3 extracts the text of the articles stored in the article storage section 51 using the article ID received from the excerpt generating control section 101 (step 40). Next, the third generating section 103-3 calculates the similarities between each paragraph and the user-profile as shown in FIG. 12 (step 41). The third generating section 103-3 stores the similarities in predetermined area assigned to the third generating section 103-3 the retrieval result storage section 53 as shown in FIG. 13.

The third generating section 103-3 extracts the paragraph in order of largest similarities in accordance with the number such as integer which the number of the all paragraph is divided by three. The third generating section 103-3 generates the excerpt which is one-third length of the article according to the number which the number of the all paragraphs divided by three (step 42). For example, if the article is consisted of fourteen paragraphs, this system extracts four paragraphs in order of largest similarities from the article. In this example, the combination of the four paragraph excerpts forms an abstract. Thus, if the length of the article is long, the third generating section 103-3 generates the excerpts including the user's interested information.

In this case, the number to divide the number of the all paragraphs may be not three. And, it may be possible that the user sets predetermined number.

The excerpt generating control section 101 receives the excerpts generated by one of the first generating section 103-1, the second generating section 103-2 and the third generating section 103-3 (step 7 in FIG. 8). The excerpt generating control section 101 sends the rank, the headline, and the excerpts of the article to the retrieval result storage section 53. Thus, the result of the information filtering is sent to the user.

The result of the information filtering generated by the excerpt generating section 100 is shown in FIG. 15. The result of the information filtering is comprised of the rank, the headline, and the excerpts of the article as shown in FIG. 15.

The result of the information filtering stored in the retrieval result storage section 53 is sent to the user by, for example, e-mail or facsimile through the transmission section 7 and the communication network. The user can send an evaluation whether he is interested in the result of the information filtering to the information filtering center 1. For example, an answer of the evaluation for the result of the information filtering is represented as symbol such as "o" or "x". The answer is transmitted from the user terminal 3 through the communication network and the transmission section 7, and the answer is stored in the user answer data storage section 60.

FIG. 16 shows an answer data by stored in the user answer data storage section 60. The answer data is represented that the interested article is marked "o", the uninterested article is marked "x", and the article either interested or not is non-marked as shown in FIG. 16. This answer is used to modify the profile for extracting predetermined article more. Thus, the profile is dynamically and automatically modified in response to user feedback.

A profile modification section 61 modifies the user-profile stored in the user-profile storage section 50 according to the answer in FIG. 16, and the text of the article extracted from the article storage section 51 by using the article ID in the answer. A method for modifying the profile is disclosed in "SMART information filtering system". In this method, frequency of appearance of each word in the interested article is counted and the word of maximum frequency is added to the profile.

As the above-mentioned, the profile of each user in the user-profile storage section 50 is modified by the answer of the user. In this system, the article retrieval section 52 retrieves the article including the user's interested information from the articles stored in the article storage section 51 by using the user-profile. Further more, the excerpt generating section 100 generates the excerpt of the retrieved article by calculating similarities between the articles and the user-profile.

When the excerpt generating section 100 generates the excerpts of the retrieved article, the article feature generating section 102 extracts the feature such as the number of characters and paragraphs. This system generates the excerpts of the article including the user's interested information because of selecting one of the first generating section 103-1, the second generating section 103-2 and the third generating section 103-3 in order to select the generating method suitable for the feature of the article.

Further more, this system sends the generated excerpt to each user. Therefore, it takes little time for the user to get the necessary information of the text of the articles from the extracted result of information filtering.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. it is intended that the specification and examples be considered as exemplary only, with the true scope and spirit of the invention being indicated by the following claims.

What is claimed is:

1. An information filtering apparatus for providing articles to a user, comprising:

retrieval means for retrieving a selected article from among articles, each having at least one paragraph, received from information sources according to retrieval conditions of the user, the retrieval conditions of the user including a profile in which words included in articles required for each user and a weight of the words are described, the retrieval means further including means for calculating similarities between each paragraph of the articles received from the information sources and the words in the profile, and means for extracting a paragraph which has a largest similarity among similarities of all paragraphs;

generation means for generating an abstract of the selected article retrieved by said retrieving means according to said retrieval conditions, the abstract including the extracted paragraph; and sending means for sending the abstract generated by said generating means to the user.

2. An information filtering apparatus according to claim 1, further comprising means for extracting a plurality of paragraphs in order of similarity with the profile.

3. An information filtering apparatus according to claim 2, wherein the number of extracted paragraphs equals the total number of paragraphs divided by any integer.

4. An information filtering apparatus according to claim 1, further comprising storage means for storing the articles received from the information sources.

5. An information filtering apparatus according to claim 4, wherein said articles stored in the storage means each include an article ID, a publisher, a headline, and text.

6. An information filtering apparatus according to claim 1, wherein said generation means includes means for extracting a first paragraph of the article retrieved by said retrieval means.

7. An information filtering apparatus for providing an extract of an article to a user, comprising;
   means for storing a user profile;
   means for selecting an article from a plurality of articles in accordance with the user profile;
   means for extracting a portion of the selected article;
   means for sending the portion to the user; and
   means for receiving an evaluation of the portion from the user and for modifying the user profile in accordance with the evaluation.

8. An information filtering apparatus according to claim 7, wherein said evaluation is represented that an interested portion is marked "o", an uninterested portion is marked "x", and the portion either interested or not is non-marked.

9. An information filtering apparatus for providing articles to a user, comprising:
   retrieval means for retrieving a selected article from among articles received from information sources according to retrieval conditions of each user, the retrieval conditions of the user including a profile in which words included in articles required for the user and a weight of the words are described;
   a plurality of generation means each for generating an excerpt of the article retrieved by said retrieval means according to said retrieval conditions and features of articles;
   feature extraction means for extracting a feature of the selected article retrieved by said retrieval means;
   selection means for selecting one of the generating means from said plurality of generation means according to the feature of the article extracted by the feature extraction means; and
   sending means for sending the excerpt of the article generated by the selected generation means to the user.

10. An information filtering apparatus according to claim 9, wherein the feature of the article is the number of characters of the text of the article.

11. An information filtering apparatus according to claim 9, wherein the feature of the article is the number of paragraphs of the text of the article.

12. An information filtering apparatus according to claim 9, wherein said selection means selects of the generation means by comparing the feature of the article with the feature of an excerpt generated by each said generation means.

13. An information filtering apparatus according to claim 9, further comprising means for calculating a similarity between each paragraph of the article retrieved by said retrieval means and words of said retrieval condition; and
   means for extracting a paragraph which has the largest similarity among similarities of all paragraphs.

14. An information filtering apparatus according to claim 13, further comprising means for extracting a plurality of paragraphs in order of similarity.

15. An information filtering apparatus according to claim 14, wherein the number of extracted paragraphs is the total number of the all paragraphs divided by any integer.

16. An information filtering apparatus according to claim 9, further comprising means for receiving an evaluation for the excerpt of the articles from the user; and
   means for modifying the retrieval conditions according to the evaluation.

17. An information filtering apparatus according to claim 16, wherein said evaluation is represented that an interested article is marked "o", an uninterested article is marked "x", and the article either interested or not is non-marked.

18. An information filtering method for providing articles to a user, comprising the steps of:
   retrieving a selected article from among articles from information sources according to retrieval conditions for the user, the retrieval conditions of the user including a profile in which words included in articles required for each user and a weight of the words are described, the retrieval step further including the sub-steps of
      calculating similarities between each paragraph of the articles received from the information sources and the words in the profile, and
      extracting a paragraph which has a largest similarity among similarities of all paragraphs;
   generating an abstract of the selected article retrieved according to said retrieval conditions, the abstract including the extracted paragraph; and
   sending the abstract to the user.

19. An information filtering method for providing articles to a user, comprising the steps of:
   retrieving a selected article from among articles from information sources according to retrieval conditions for the user, the retrieval conditions of the user including a profile in which words included in articles required for the user and a weight of the words are described;
   extracting a feature of the selected article;
   generating an abstract of the selected article according to said retrieval conditions and said feature of the article extracted in the extracting step, the abstract of the selected article including a paragraph of the selected article that is most similar to the words in the user profile; and
   sending the abstract to the user.

20. A computer readable memory containing computer-readable instructions, comprising:
   instruction means for causing a computer to retrieve a selected article from among articles received from information sources according to retrieval conditions for a user, the retrieval conditions of the user including a profile in which words included in articles required for each user and a weight of the words are described, the retrieval step further including the sub-steps of
      calculating similarities between each paragraph of the articles received from the information sources and the words in the profile, and
      extracting a paragraph which has a largest similarity among similarities of all paragraphs;
   instruction means for causing a computer to generate an abstract of the selected article according to the retrieval condition, the abstract including the extracted paragraph; and
   instruction means for causing a computer to send the abstract to the user.

21. A computer readable memory containing computer-readable instructions, comprising:
   instruction means for causing a computer to retrieve a selected article from among articles from information sources according to retrieval conditions for a user, the retrieval conditions of the user including a profile in which words included in articles required for the user and a weight of the words are described;

instruction means for causing a computer to extract a feature of the selected article;

instruction means for causing a computer to generate an abstract of the selected article according to the retrieval conditions and the feature of the selected article, the abstract of the selected article including a paragraph of the selected article that is most similar to the words in the user profile; and instruction means for causing a computer to send the abstract to the user.

* * * * *